(12) United States Patent
He et al.

(10) Patent No.: US 8,590,562 B2
(45) Date of Patent: Nov. 26, 2013

(54) FLUID FLOW DETECTION DEVICE

(75) Inventors: Canlong He, St. Louis, MO (US); Paul G. Conley, St. Charles, MO (US)

(73) Assignee: Lincoln Industries Corporation, St. Louis, MO (US)

( * ) Notice: Subject to any disclaimer, the term of this patent is extended or adjusted under 35 U.S.C. 154(b) by 361 days.

(21) Appl. No.: 12/971,289

(22) Filed: Dec. 17, 2010

(65) Prior Publication Data

US 2012/0152376 A1    Jun. 21, 2012

(51) Int. Cl.
| | | |
|---|---|---|
| *G01F 1/24* | (2006.01) | |
| *G01F 1/26* | (2006.01) | |
| *F16K 37/00* | (2006.01) | |
| *F16K 15/06* | (2006.01) | |
| *F17D 3/01* | (2006.01) | |

(52) U.S. Cl.
USPC ........ 137/554; 137/557; 137/539.5; 340/611; 73/1.18; 73/1.22; 73/1.23; 73/861.71

(58) Field of Classification Search
USPC ............... 137/539, 539.5, 554, 557; 340/606, 340/611; 200/81.9 M; 73/1.22, 1.23, 73/861.71, 861.47, 1.18
See application file for complete search history.

(56) References Cited

U.S. PATENT DOCUMENTS

| | | | |
|---|---|---|---|
| 2,136,261 A | 11/1938 | Anderson | |
| 2,310,504 A | 2/1943 | Aubert | |
| 2,523,666 A | 9/1950 | Moth | |
| 2,826,754 A | 3/1958 | Carignan | |
| 2,867,481 A | 1/1959 | Hornbostel | |
| 2,963,563 A | 12/1960 | Patterson | |
| 3,025,559 A * | 3/1962 | Basinger | 16/85 |
| 3,300,769 A | 1/1967 | Batur | |
| 3,320,382 A | 5/1967 | Beale | |
| 3,322,234 A | 5/1967 | Mueller | |
| 3,468,338 A | 9/1969 | Patterson | |
| 3,500,958 A | 3/1970 | Callahan | |
| 3,507,359 A * | 4/1970 | Warnock | 184/6 |
| 3,522,731 A | 8/1970 | Wilson | |

(Continued)

FOREIGN PATENT DOCUMENTS

| | | |
|---|---|---|
| DE | 19518869 A1 | 11/1996 |
| JP | 60101213 A | 6/1985 |

(Continued)

OTHER PUBLICATIONS

Publication titled "Lube Logic, FS30009 Grease Flow Sensor" by G. P. Reeves Inc., , copyright 2009, 1 page.

(Continued)

*Primary Examiner* — Craig Schneider
*Assistant Examiner* — Atif Chaudry
(74) *Attorney, Agent, or Firm* — Senniger Powers LLP

(57) ABSTRACT

A fluid flow detection device includes a housing of non-magnetic metal, a flow passage through the housing and a valve seat in the flow passage. A magnetic valve element emits a magnetic field. The valve element is movable relative to the valve seat between a closed position blocking fluid flow through the flow passage and an open position allowing fluid flow through the flow passage. The magnetic valve element is biased toward the closed position. A magnetic field enhancer is movable with the magnetic valve element for enhancing the magnetic field. A magnetic field sensor on the housing is operable to signal a change in position of the valve element as it moves between its open and closed positions.

20 Claims, 6 Drawing Sheets

(56) References Cited

U.S. PATENT DOCUMENTS

| | | |
|---|---|---|
| 3,526,297 A | 9/1970 | Rotter |
| 3,636,767 A | 1/1972 | Duffy |
| 3,722,967 A | 3/1973 | Lewis |
| 3,951,480 A | 4/1976 | Nicholson |
| 3,958,725 A | 5/1976 | Reeve |
| 4,114,560 A | 9/1978 | Wegmann |
| 4,213,021 A | 7/1980 | Alexander |
| 4,507,976 A | 4/1985 | Banko |
| 4,574,920 A | 3/1986 | Callahan |
| 4,619,146 A | 10/1986 | Teodorescu |
| 4,642,614 A | 2/1987 | Cook |
| 4,759,427 A | 7/1988 | Onose et al. |
| 5,002,090 A | 3/1991 | Ichikawa |
| 5,038,892 A | 8/1991 | Maloney |
| 5,115,684 A | 5/1992 | Haeussler |
| 5,126,722 A * | 6/1992 | Kamis .................. 340/606 |
| 5,284,061 A | 2/1994 | Seeley |
| 5,293,959 A | 3/1994 | Kimberlin |
| 5,400,650 A | 3/1995 | Niehaus |
| 5,544,533 A | 8/1996 | Sugi |
| 5,626,467 A | 5/1997 | Cantley |
| 6,164,322 A | 12/2000 | Najmolhoda |
| 6,216,727 B1 | 4/2001 | Genova |
| 6,322,336 B1 | 11/2001 | Huss |
| 6,338,278 B1 | 1/2002 | Tsataros |
| 6,338,279 B1 | 1/2002 | Tsataros |
| 6,339,959 B1 | 1/2002 | Natapov |
| 6,472,624 B1 | 10/2002 | Harris |
| 6,741,179 B2 | 5/2004 | Young |
| 6,769,310 B2 | 8/2004 | Carlson |
| 6,938,455 B2 | 9/2005 | Yakura |
| 7,130,750 B1 | 10/2006 | Stevens |
| 7,363,824 B2 | 4/2008 | Buck |
| 7,584,657 B2 | 9/2009 | Heller |
| 7,592,921 B2 | 9/2009 | Young |
| RE40,933 E | 10/2009 | Young |
| 2002/0144865 A1 | 10/2002 | Clancy et al. |
| 2003/0039561 A1 | 2/2003 | Batten et al. |
| 2007/0177835 A1 | 8/2007 | Verhaegen |
| 2009/0167540 A1 | 7/2009 | Struyk |
| 2010/0024566 A1 | 2/2010 | Harper |

FOREIGN PATENT DOCUMENTS

| | | |
|---|---|---|
| JP | 02080815 A | 3/1990 |
| JP | 02195020 A | 8/1990 |
| JP | 3172766 A | 7/1991 |
| JP | 11270788 A | 10/1999 |
| JP | 2001208290 A | 8/2001 |
| JP | 2003065494 A | 3/2003 |

OTHER PUBLICATIONS

Publication titled "Turck Works Industrial Automation, Universal Magnetic Field Sensors", dated Oct. 2007, 6 pages.

* cited by examiner

US 8,590,562 B2

FLUID FLOW DETECTION DEVICE

FIELD OF THE INVENTION

The present invention generally relates to lubrication equipment, and more particularly to a fluid flow detection device for a lubricant delivery device.

BACKGROUND OF THE INVENTION

Effective lubrication is necessary to maintain efficient and prolonged operation of equipment having bearings and other wear parts. To ensure effective lubrication, it is important to monitor whether lubricant is being properly delivered to such equipment and, if not, to alert an operator so that corrective action can be a taken before the equipment is damaged or fails.

One system that has been proposed for monitoring fluid is disclosed in U.S. Pat. No. 4,642,614 to Cook, incorporated herein by reference. The Cook patent discloses a fluid flow monitoring system for monitoring intermittent flow of lubricant through lubricant lines. The monitoring system includes signal lights for indicating to the operator the various conditions of the system. A thermistor in the line of flow indicates the occurrence of lubricant flow based on the temperature of the thermistor. A cooling of the thermistor signals that lubricant is flowing through the line, and a heated thermistor temperature signals a fault condition where lubricant is not flowing.

Although conventional fluid flow monitoring systems are capable of monitoring lubricant flow in a lubricant line, there is a need for a more sensitive and durable mechanism for detecting fluid flow and for providing a more accurate and reliable indication of a fault condition in a lubricant line.

SUMMARY OF THE INVENTION

In one aspect, a fluid flow detection device generally comprises a housing of non-magnetic metal, a flow passage through the housing and a valve seat in the flow passage. A magnetic valve element emits a magnetic field. The valve element is movable relative to the valve seat between a closed position blocking fluid flow through the flow passage and an open position allowing fluid flow through the flow passage. The magnetic valve element is biased toward the closed position. A magnetic field enhancer is movable with the magnetic valve element for enhancing the magnetic field. A magnetic field sensor on the housing is operable to signal a change in position of the valve element as it moves between its open and closed positions.

In another aspect, a lubricant delivery system generally comprises a lubricant delivery device for delivering lubricant to a lubrication site at intermittent intervals. A flow detection device comprises a non-magnetic metal housing. A flow passage through the housing has an inlet in communication with the lubricant delivery device and an outlet in communication with the lubrication site. A valve seat is in the flow passage. A magnetic valve element is movable relative to the valve seat between a closed position blocking fluid flow through the flow passage and an open position allowing fluid flow through the flow passage. The magnetic valve element is biased toward the closed position. A magnetic field enhancer is movable with the magnetic valve element for enhancing the magnetic field adjacent the magnetic valve element. A magnetic field sensor on the housing is operable to signal a change in position of the valve element as it moves between its open and closed positions. A controller controls operation of the lubricant delivery device and receives signals from the magnetic field sensor.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
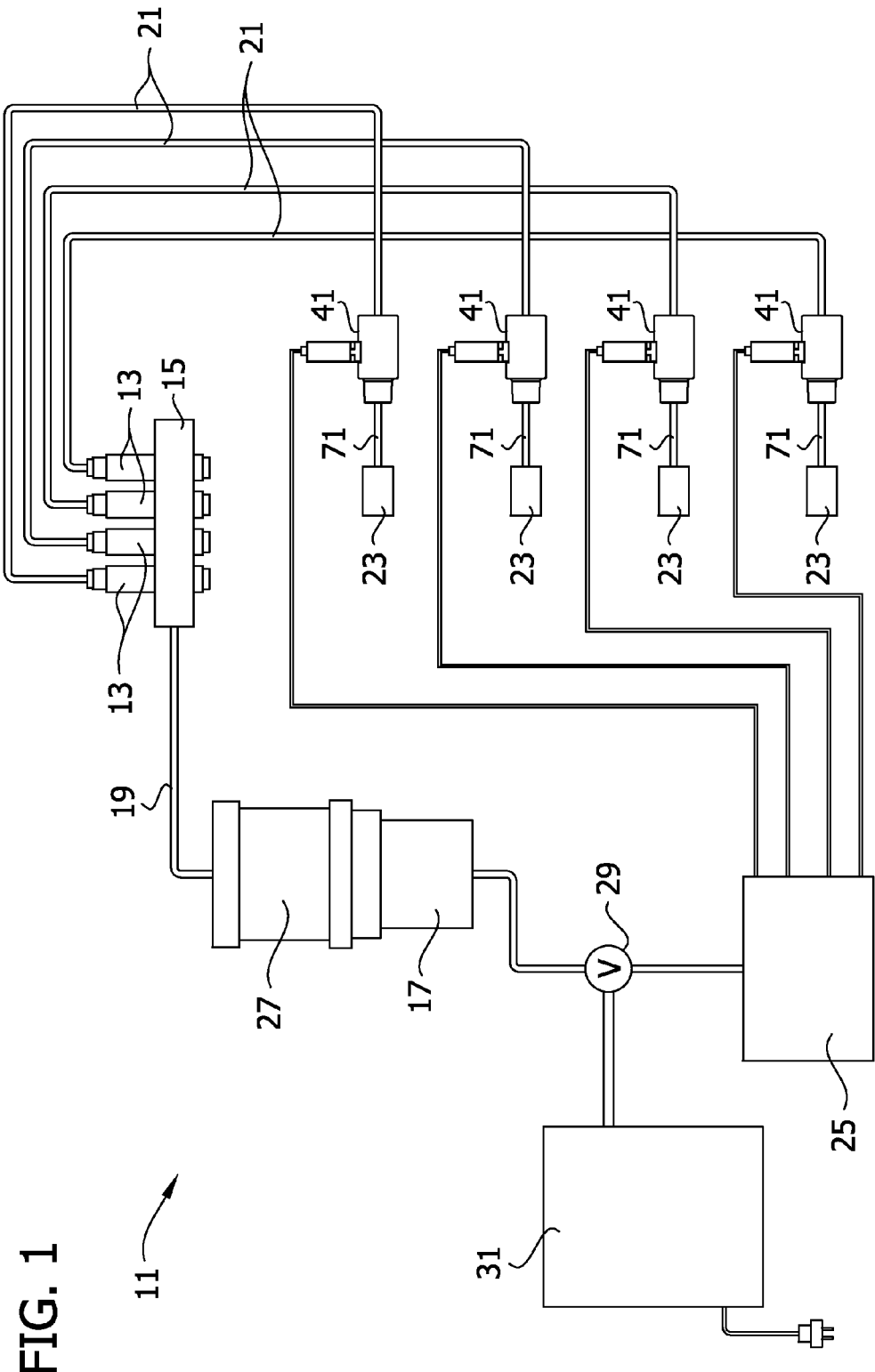
FIG. 1 is a schematic of a lubricant delivery system.

Referring to the figures, and in particular FIG. 1, a lubrication delivery system is generally indicated at 11. The delivery system 11 comprises a lubricant distributor including (in this embodiment) a plurality of lubricant injectors 13 connected to a lubricant manifold 15. A lubricant pump 17 (broadly, "a lubricant delivery device") is adapted to supply lubricant (e.g., grease) under pressure to the manifold 15 through a supply line 19. The pump 17 can be periodically operated to deliver lubricant to the manifold 15. Pressure build-up in the manifold 15 causes each injector 13 to deliver a small metered charge of lubricant through a dedicated output line 21 to a lubrication site 23. The delivery system 11 is configured to deliver a charge of lubricant as small as about 0.0015 cubic inch (in$^3$). A controller 25 is operatively connected to the pump 17 for controlling operation of the pump.

A reservoir 27 supplies the pump 17 with lubricant. Although other types of pumps may be used without departing from the scope of the present invention, in one embodiment the pump 17 is an air-operated plunger-type lubricant pump. A solenoid valve 29 controlled by an electrical timer 31 is provided to control when air is supplied to the pump 17. The timer 31 may be of any type conventionally used to control pumping operations in a lubricant injector system. When the timer 31 is energized, it functions to intermittently actuate the valve 29 to supply air to operate the pump 17 for a timed delivery period to deliver lubricant under pressure through the supply line 19 to the manifold 15. When the pressure reaches a predetermined level, the injectors 13 deliver their metered charges of lubricant. The periodic operation of the pump 17, as controlled by the timer 31, intermittently delivers lubricant to the lubrication sites 23. After each delivery period, the valve 29 is deactivated for a period of time to allow pressure in the manifold 15 to drop and the injectors 13 to recharge.

Figure 5:
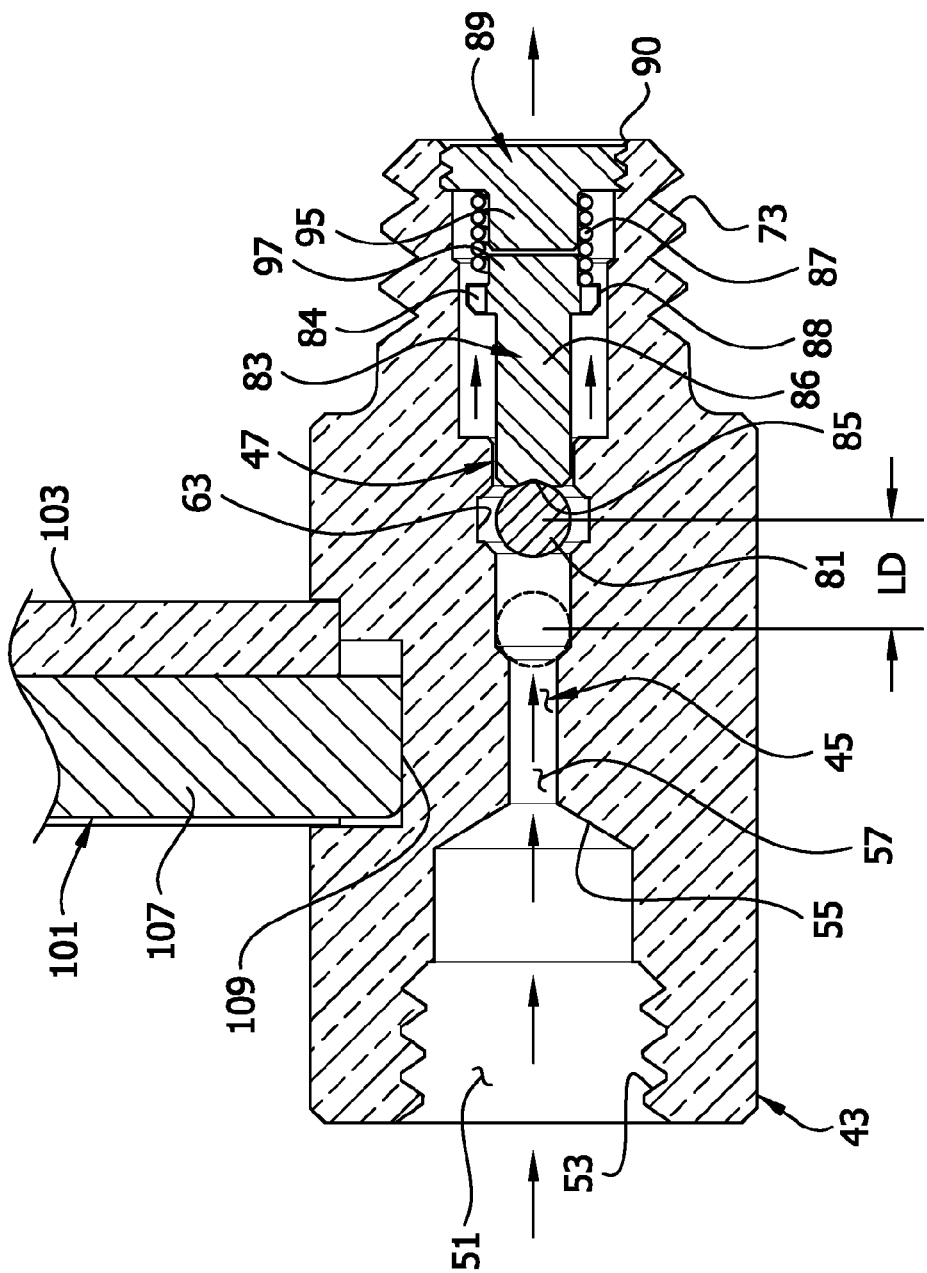
FIG. 5 is an enlarged cross section of the fluid flow detection device as shown in FIG. 4 with the valve assembly in an open position.
Figure 6:
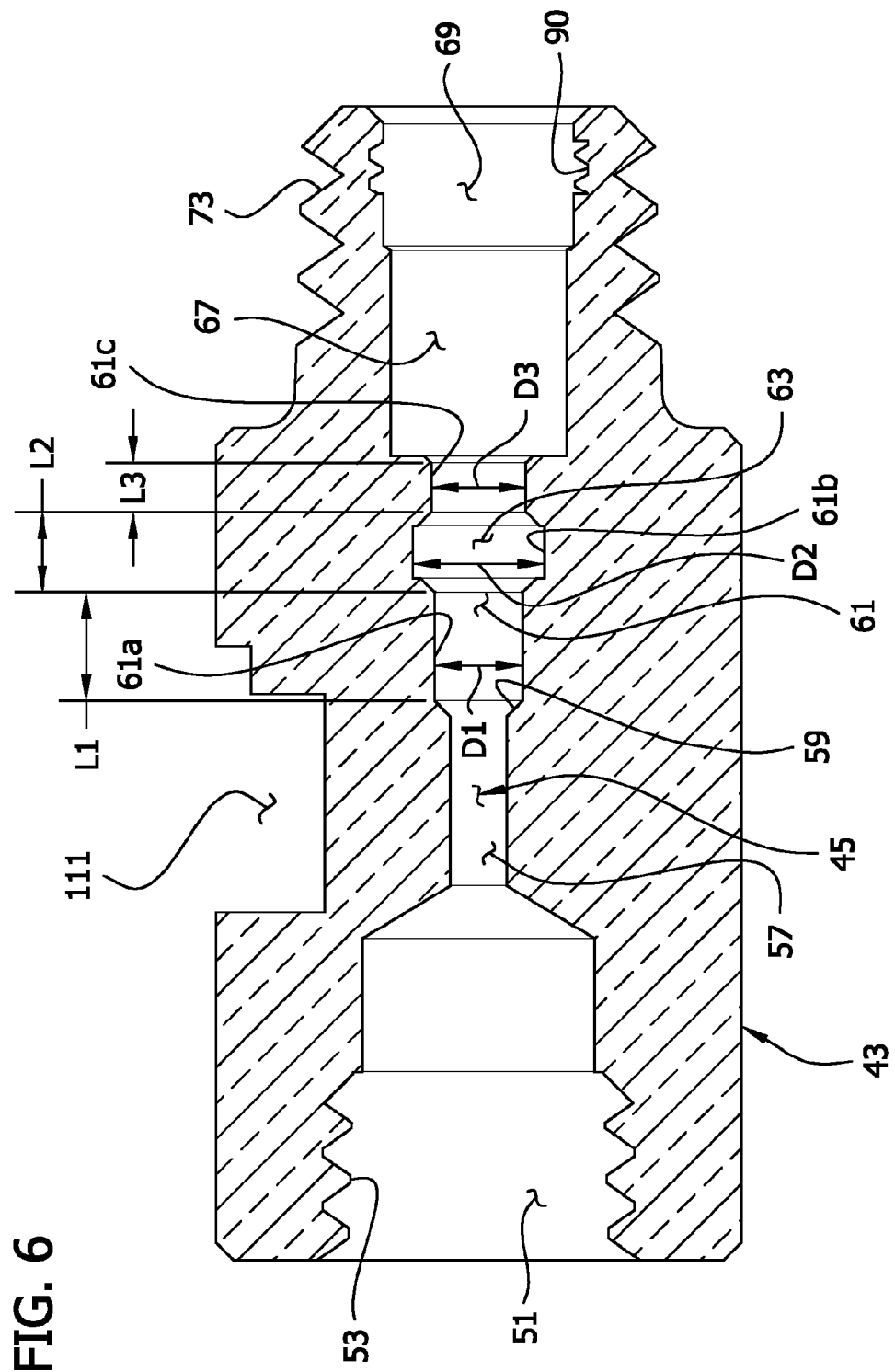
FIG. 6 is an enlarged cross section of a housing of the fluid flow detection device with the valve assembly removed.

Each output line 21 is fitted with a fluid flow detection device, generally indicated at 41, to detect fluid flow through the respective line. Referring to FIGS. 2-6, the detection device 41 comprises a non-magnetic metal housing 43 having a central flow passage 45 extending longitudinally through the housing (FIGS. 4-6). The housing 43 may be formed from brass, aluminum, stainless steel, or any other suitable non-magnetic material. A valve assembly 47 is disposed in the flow passage 45 and is moveable between a closed position (FIG. 4) blocking fluid flow through the flow passage 45 and an open position (FIG. 5) allowing fluid flow through the flow passage.

Referring to FIG. 6, the flow passage 45 includes a relatively wide inlet portion 51 having internal threads 53 for attaching an inlet end of the detection device 41 to the output line 21. The downstream end of the inlet portion 51 tapers inward to a relatively narrow middle portion 57 of the flow passage. The downstream end of the middle portion 57 tapers outward to define a valve seat 59. The flow passage 45 also includes a first valve portion 61 extending downstream from the valve seat 59, and a second valve portion 67 extending downstream from the first valve portion. The first valve portion 61 has relatively narrow upstream section 61a immediately downstream from the valve seat 59, a wider section 61b downstream from the relatively narrow section defined in part by an annular recess 63 extending around a midsection of the first valve portion, and a downstream section 61c downstream from the wider section. The valve assembly 47 is positioned in the first and second valve portions 61, 67 of the flow passage 45 (FIGS. 4 and 5). An outlet portion 69 of the flow passage 45 extends downstream from the second valve portion 67. External threads 73 are provided on the housing 43 surrounding the second valve portion 67 and the outlet portion 69 of the flow passage 45 for attaching the outlet end of the detection device 41 to a connection line 71 (FIG. 1) that fluidly connects the detection device to the respective lubrication site 23.

By way of example but not limitation, the upstream flow passage section 61a has a diameter D1 of about 0.127 in. and a length L1 of at least about 0.125 in. In the illustrated embodiment, the length L1 of the upstream flow passage section 61a is about 0.250 in. The wider section 61b has a maximum diameter D2 of about 0.185 in. and a length L2 of about 0.125 in. The downstream flow passage section 61c has a diameter D3 of about 0.135 in. and a length L3 of about 0.075 in. The housing 43 and flow passage 45 may have other configurations (shapes and/or dimensions) without departing from the scope of this invention.

As shown in FIGS. 4 and 5, the valve assembly 47 comprises a magnetic valve element 81 that emits a magnetic field. The valve element 81 is configured to move in the flow passage 45 between the closed position shown in FIG. 4 and the open position shown in FIG. 5. In the illustrated embodiment, the valve element 81 is a magnetic ball valve made of metal (e.g., Neodymium, or NdFeB). The ball valve has a relatively small diameter. By way of example, the ball valve 81 may have a diameter in a range from about 0.125 inch (in.) to about 0.25 in. In a preferred embodiment, the ball valve 81 has a diameter in a range from about 0.125 in. to about 0.188 in.

The valve assembly 47 also includes a magnetic field enhancer 83 of a ferrous material (e.g., carbon steel or low alloy carbon steel) for enhancing the magnetic field emitted by the relatively small magnetic valve element 81. In the illustrated embodiment, the magnetic field enhancer comprises a plunger (also designated 83) positioned in the flow passage 45 downstream from the valve element 81. The plunger 83 comprises a generally cylindrical body 86 extending longitudinally in the first valve portion 61 of the flow passage 45 and a head 97 at the downstream end of the plunger body positioned in the second valve portion 67 of the flow passage. The head 97 of the plunger 83 has a radial flange 88 with openings 84. The upstream end of the plunger body 83 is in contact with the valve element 81 and has a recess 85 for partially receiving the valve element. One end of a coil compression spring 87 engages the flange 88 on the head 97 of the plunger 83 and biases the plunger toward the valve element 81 and the valve seat 59. The other end of the spring 87 is seated on a plug 89 in threaded engagement with internal threads 90 in the outlet portion 69 of the flow passage 45. A post 95 of the plug 89 is received in the spring 87 to locate the spring on the plug. The plug 89 is recessed on opposite sides forming openings 91 (FIG. 3) allowing lubricant to pass and a central slot 93 for receiving a tool to rotate the plug to facilitate adjustment of the compression of the spring 87.

The plunger body 86 also provides flow restriction for extended displacement of the valve element 81. To unseat the valve element 81 from the valve seat 59 an initial force is exerted on the valve element by lubricant in the flow passage 45. As lubricant flows in the downstream direction past the valve seat 59, a friction force is generated between the lubricant and the surfaces of the valve element, plunger 83, and flow passage walls. This frictional force is sufficient to overcome the bias of the spring 87. Various factors contribute to providing the requisite frictional force, including the relatively small clearance (e.g., 0.001 in.) between the valve element 81 and the upstream flow passage section 61a, the relatively small clearance (e.g., 0.005 in.) between the plunger 83 and the downstream flow passage section 61c, and the length L3 of the flow passage section 61c. The combination of these factors may be varied to provide the desired results.

Desirably, the diameter D2 of the wider flow passage section 61b is relatively large compared to the upstream flow passage section 61a so that fluid flow restriction is substantially reduced when the valve element 81 is in the wider flow passage section. The diameter D3 of the downstream section 61c is slightly larger than the diameter of the upstream section 61a to facilitate the passing of lubricant out the output end of the detection device 41. However, the diameter D3 is still small enough to maintain the necessary friction between the lubricant and the plunger 83 to hold the spring 87 in its compressed state. Although the illustrated embodiment shows the first valve portion 61 of the flow passage as having three sections of different diameters, this portion 61 of the flow passage could have a uniform diameter along its entire length. Such a construction would require an optimization of a diameter of the valve portion 61 of the flow passage 45 and the size of the valve element 81. A clearance of at least about 0.001 in. would be preferred for this configuration.

When the valve assembly 47 is in its closed position (FIG. 4), the spring 87 urges the plunger 83 and the valve element 81 in an upstream direction to move the valve element into contact with the valve seat 59, closing off fluid flow to the outlet end of the detection device 41. When a predetermined pressure is exerted on the valve element 81 by lubricant in the flow passage 45, the lubricant pressure unseats the valve element 81 from the valve seat 59, allowing fluid to flow to the outlet end of the detection device 41. As noted previously, the plug 89 can be rotated to adjust the force exerted by the spring 87. Rotating the plug 89 to move the plug toward the plunger 83 increases the bias of the spring 87 on the plunger, requiring a greater lubricant pressure to unseat the valve element 81 from the valve seat 59. Conversely, rotating the plug 89 to move the plug away from the plunger 83 decreases the bias of the spring 87, reducing the lubricant pressure needed to unseat the valve element 81.

Figure 2:
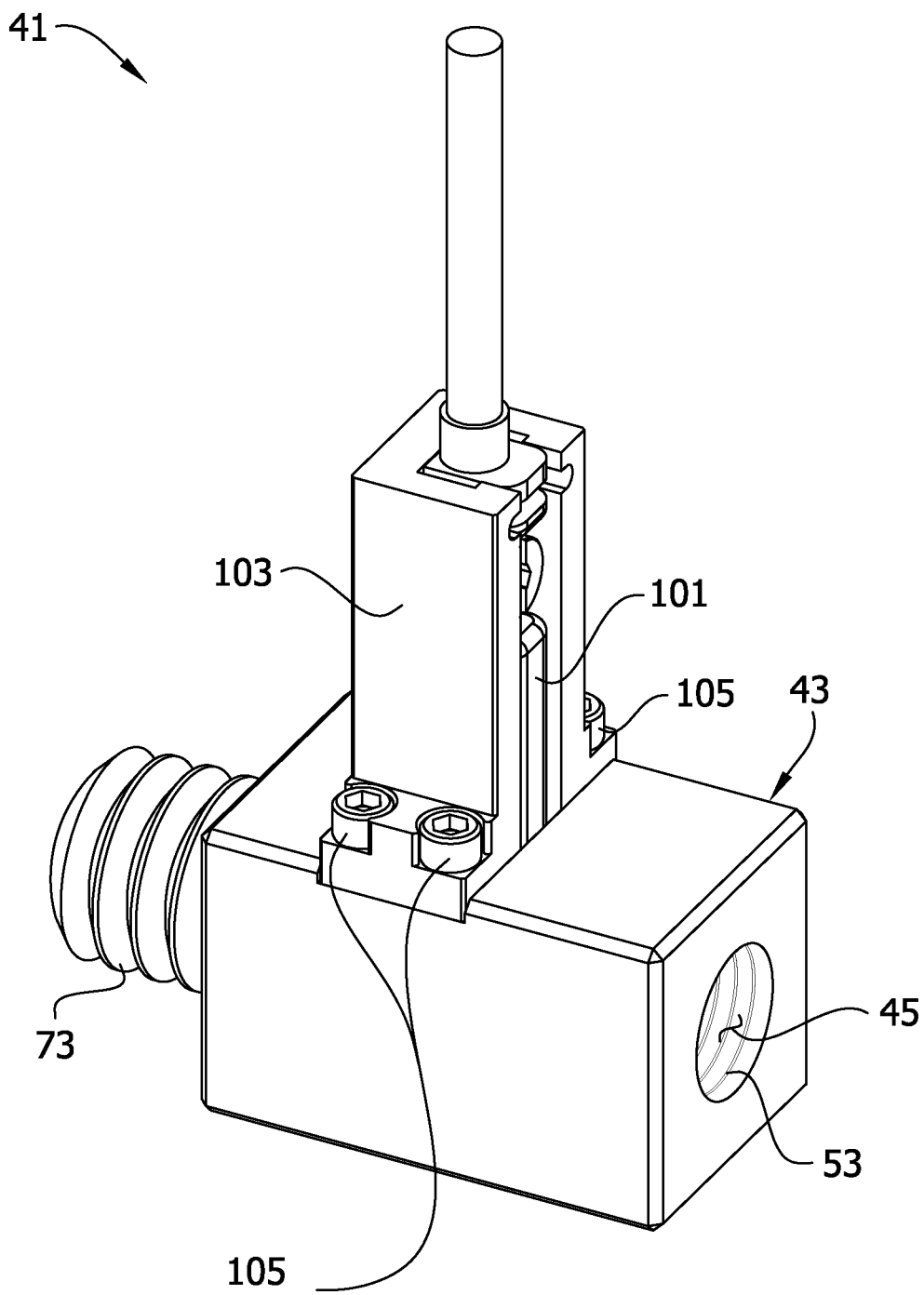
FIG. 2 is a perspective of a fluid flow detection device of the lubricant delivery system.
Figure 3:
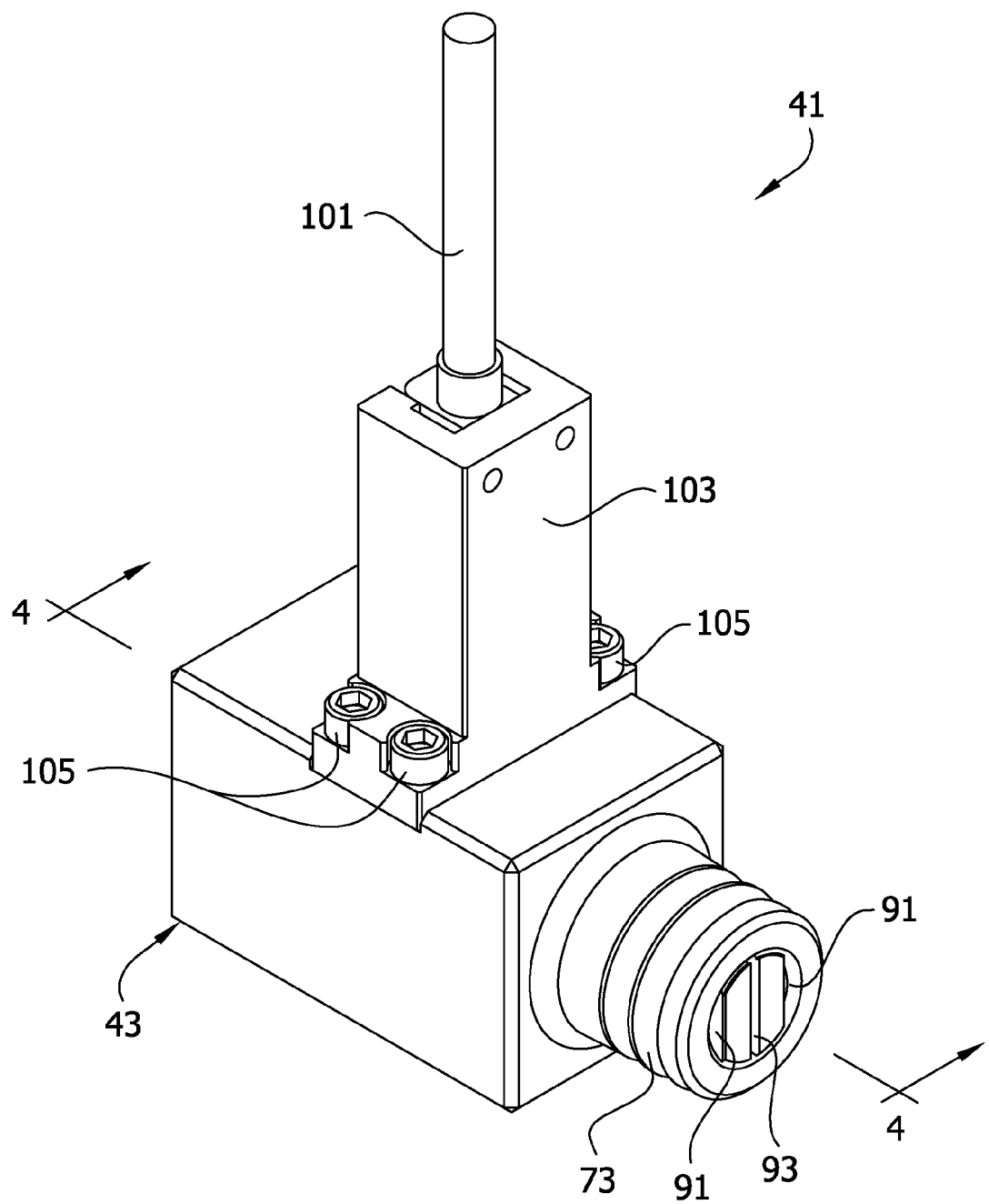
FIG. 3 is a perspective of the fluid flow detection device taken from an alternative point of view.
Figure 4:
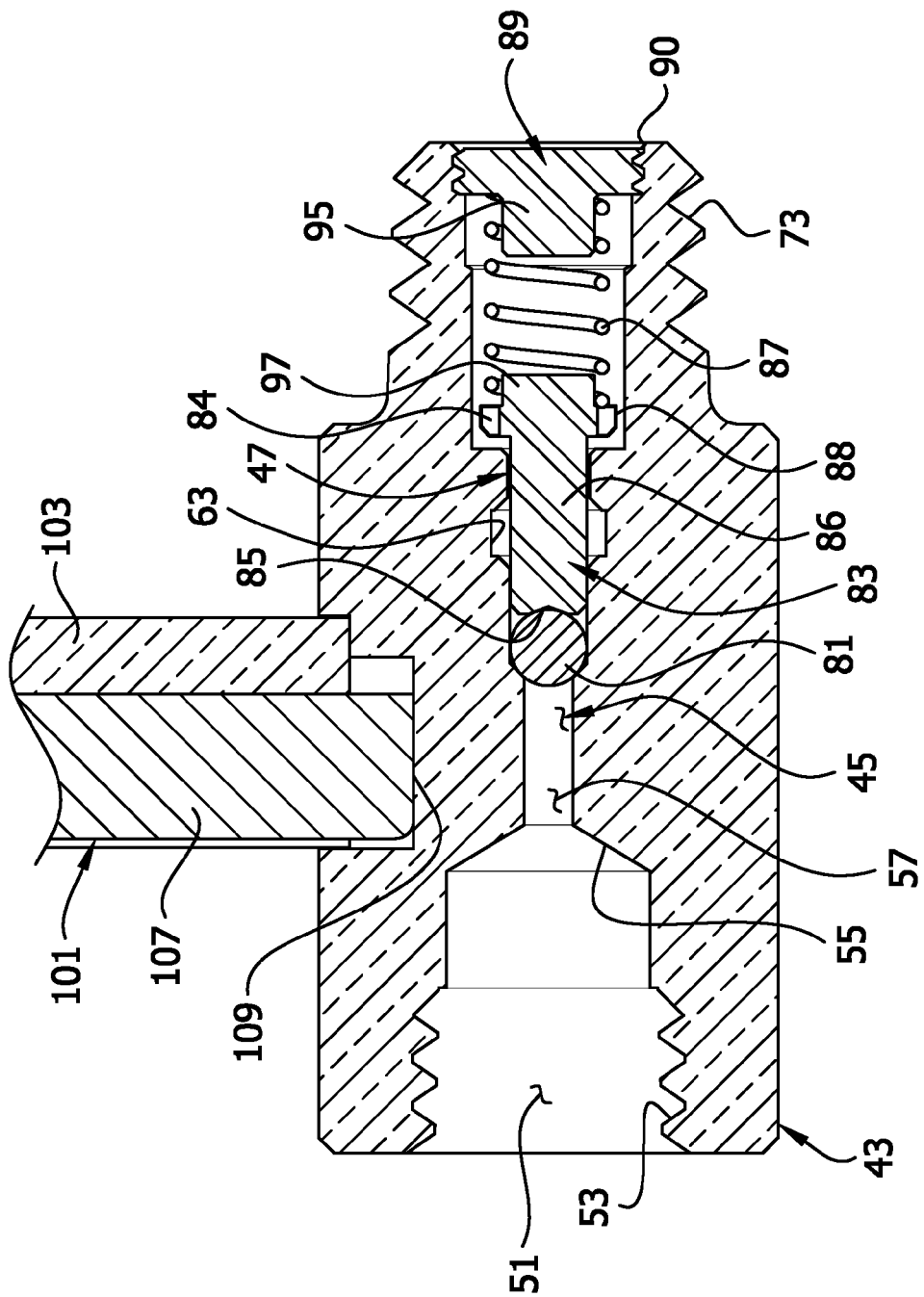
FIG. 4 is an enlarged cross section of the fluid flow detection device taken through line 4-4 in FIG. 3 with portions broken away and showing a valve assembly in a closed position.

Referring to FIGS. 2-4, a magnetic field sensor 101 is secured to the housing 43 by a mount 103 attached to the housing by fasteners 105. The magnetic field sensor 101 may be a solid-state inductive sensor such as the BIM-UNT magnetic field sensor produced by TURCK Inc. The sensor 101 comprises a base 107 and a sensing face 109 adjacent a front end of the base (FIGS. 4 and 5). The front end of the base 107 is received in a recess 111 (FIG. 6) in the outer surface of the housing 43. The recess 111 allows the sensing face 109 of the sensor 101 to be positioned close to the valve assembly 47 so that the magnetic field emitted by the valve element 81 and enhanced by the plunger 83 can be readily sensed by the sensor. By sensing the strength of the magnetic field emitted by the valve element 81, the sensor 101 is configured to signal a change in the position of the valve element as it moves in the flow passage 45 between its open and closed positions. The sensor 101 is operatively connected to the controller 25 (FIG. 1) to send signals to the controller 25 regarding the open or closed position of the valve element 81. The magnetic field sensor 101 can be mounted on the housing 43 in other ways to ensure a close proximity to the valve assembly 47. For instance, the sensor 101 can be mounted so that the sensing face 109 is flush with a bottom of the mount 103.

In use, the lubricant delivery device is configured to deliver lubricant through the output lines 21 and flow detection devices 41 to the lubrication sites 23. A fluid flow volume as small as 0.0015 in$^3$ is sufficient to unseat the valve element 81 from the valve seat 59 and move the valve element a distance LD into registration with the annular recess 63 in the first valve portion 61 of the flow passage 45 (FIG. 5). In one embodiment, the valve element 81 moves a distance LD of about 0.075 inches in response to the minimum fluid flow volume of about 0.001 in$^3$. However, the distance that the valve element 81 travels varies according to the volume of fluid flow in the passage 45. By way of example but not limitation, the distance can vary between about 0.075 in. and about 0.15 in. Desirably, the length L1 of the upstream flow passage section 61a is equal to or greater than the minimum distance the valve element 81 needs to travel to be sensed as moving between its open and closed positions by the sensor 101. The larger diameter D2 of the annular recess 63 relative to the valve element 81 also allows the valve element to float in the clearance space. This arrangement permits a wider range of flow rates without the necessity of adjusting the compression of the spring 87. As previously explained, the length L2 of the annular recess 63 can vary or the recess can be removed altogether. Lubricant passing the valve element 81 flows through an annular clearance space around the plunger body 83 in the downstream section 61c of the first valve portion 61 of the flow passage 45, past the plunger head 97 (as facilitated by the openings 84 in the flange 88) and through the openings 91 for delivery to the respective lubrication site 23.

Movement of the valve element 81 away from the valve seat 59 to its open position (FIG. 5) causes a shift in the magnetic field emitted by the valve element, as enhanced by the ferrous plunger 83. This shift is sensed by the magnetic field sensor 101 which operates to signal the controller 25 that the valve assembly 47 has opened. Conversely, movement of the valve element 81 back to its closed position (FIG. 4) is also sensed by the sensor 101 and communicated to the controller 25 indicating that the valve assembly 47 has closed.

During normal operation, lubricant is delivered through each output line 21 to a bearing or other device at a respective lubrication site 23. The detection device 41 in the output line 21 senses the occurrence of lubricant delivery by movement of the valve element 81 between its closed and open positions and send normal-condition signals to the controller indicating a normal (proper) operating condition. However, if there is a failure of lubricant delivery, e.g., due to a blockage in the output line 21 or at the lubrication site 23, the valve element 81 will fail to move in the normal manner, and the detection device 41 will not send normal-condition signals to the controller, thereby indicating a fault condition, i.e., a failure of lubricant delivery. Desirably, the controller then activates an alarm to alert an operator to the fault condition so that corrective action to restore normal lubricant delivery.

Having described the invention in detail, it will be apparent that modifications and variations are possible without departing from the scope of the invention defined in the appended claims. By way of example but not limitation, the magnetic field enhancer may have configurations other than the plunger 83 illustrated in the drawings. Any configuration is acceptable so long as it permits the desired flow through the flow passage 45 and increases the magnetic field around the relatively small magnetic valve element 81 to an extent such that movement of the valve element between its open and closed positions is sensed by the magnetic field sensor 101. Also the fluid flow detection device 41 can be used with lubricant distributors other than those including the injectors 13 shown in the illustrated embodiment. For instance the detection device 41 can be used with a lubricant distributor comprising one or more divider valves or other valve mechanisms.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A fluid flow detection device, comprising
    a housing of non-magnetic metal,
    a flow passage through the housing,
    a valve seat in the flow passage,
    a magnetic valve element comprising a magnetized metal ball valve emitting a magnetic field, said valve element being movable relative to the valve seat between a closed position blocking fluid flow through the flow passage and an open position allowing fluid flow through the flow passage, said magnetic valve element being biased toward said closed position,
    a magnetic field enhancer movable with the magnetic valve element for enhancing said magnetic field, and
    a magnetic field sensor on the housing operable to signal a change in position of the valve element as it moves between its open and closed positions.

2. A fluid flow detection device as set forth in claim 1 wherein the valve element is sized to move from its closed position toward its open position a distance sufficient to be sensed by said magnetic field sensor in response to a fluid flow volume as small as 0.0015 cubic inch.

3. A fluid flow detection device as set forth in claim 1 wherein the magnetized metal ball valve having a diameter in a range from about 0.125 inch to about 0.25 inch.

4. A fluid flow detection device as set forth in claim 3 wherein the metal ball valve has a diameter in a range from about 0.125 inch to about 0.188 inch.

5. A fluid flow detection device as set forth in claim 3 wherein said flow passage has a relatively narrow section immediately downstream from the valve seat and a wider section downstream from the first narrow section at a position aligned with the valve element when the element is in the open position, said wider section having a diameter greater than the diameter of the metal ball.

6. A fluid flow detection device as set forth in claim 3 wherein the magnetic field enhancer is downstream from the ball valve.

7. A fluid flow detection device as set forth in claim 6 wherein the magnetic field enhancer comprises a metal plunger extending longitudinally with respect to the flow passage.

8. A fluid flow detection device as set forth in claim 7 further comprising a spring engaging to plunger for biasing the plunger and ball valve toward said valve seat.

9. A fluid flow detection device as set forth in claim 8 further comprising a device for adjusting the biasing force exerted by the spring.

10. A fluid flow detection device as set forth in claim 7 wherein the magnetic field sensor is a solid-state sensor.

11. A fluid flow detection device as set forth in claim 10 wherein the solid-state sensor comprises a body and a sensing face adjacent a front end of the body, the front end of the body being mounted in a recess in the housing configured to reduce the distance between the sensing face and the magnetic valve element.

12. A fluid flow detection device as set forth in claim 11 wherein the recess comprises a bore extending generally at right angles to a centerline of the fluid flow passage.

13. A fluid flow detection device as set forth in claim 1 wherein the flow passage has an inlet end configured for receiving a lubricant feed line.

14. A fluid flow detection device as set forth in claim 13 wherein the lubricant comprises grease or oil.

15. A fluid flow detection device as set forth in claim 1 wherein the housing comprises brass, aluminum, or stainless steel.

16. A fluid flow detection device as set forth in claim 1 installed in a lubricant delivery system comprising a lubricant distributor for delivering metered volumes of lubricant to a lubrication site at intermittent intervals, said flow passage in the non-magnetic housing having an inlet in communication with the lubricant distributor and an outlet in communication with the lubrication site.

17. A lubricant delivery system, comprising:
    a lubricant delivery device for delivering lubricant to a lubrication site at intermittent intervals;
    a flow detection device comprising a non-magnetic metal housing, a flow passage through the housing having an inlet in communication with the lubricant delivery device and an outlet in communication with the lubrication site, a valve seat in the flow passage, a magnetic valve element comprising a magnetized metal ball valve movable relative to the valve seat between a closed position blocking fluid flow through the flow passage and an open position allowing fluid flow through the flow passage, said magnetic valve element being biased toward said closed position, a magnetic field enhancer movable with the magnetic valve element for enhancing the magnetic field adjacent the magnetic valve element, and a magnetic field sensor on the housing operable to signal a change in position of the valve element as it moves between its open and closed positions; and
    a controller for controlling operation of the lubricant delivery device and receiving signals from the magnetic field sensor.

18. A lubricant flow detection device as set forth in claim 17 wherein the valve element is sized to move from its closed position toward its open position a distance sufficient to be sensed by said magnetic field sensor in response to a fluid flow volume as small as 0.0015 cubic inch.

19. A fluid flow detection device as set forth in claim 18 wherein the magnetized metal ball valve having a diameter in a range of about 0.125 inch to about 0.25 inch.

20. A fluid flow detection device as set forth in claim 19 wherein the magnetic field enhancer comprises a metal plunger extending longitudinally of the flow passage downstream from the ball valve.

\* \* \* \* \*